United States Patent
Haartsen

(10) Patent No.: US 7,522,689 B2
(45) Date of Patent: Apr. 21, 2009

(54) CLOCK RECOVERY IN COMMUNICATION SYSTEMS

(75) Inventor: Jacobus Cornelis Haartsen, Hardenburg (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 780 days.

(21) Appl. No.: 10/253,199

(22) Filed: Sep. 23, 2002

(65) Prior Publication Data

US 2004/0057499 A1    Mar. 25, 2004

(51) Int. Cl.
*H04L 7/00* (2006.01)
*H04B 1/00* (2006.01)

(52) U.S. Cl. .................. 375/368; 375/132; 370/509

(58) Field of Classification Search ............... 375/130, 375/133, 146, 147, 150, 152, 354–355, 356, 375/364, 365, 366, 132, 136, 142, 143, 362, 375/368; 370/503, 509, 350

See application file for complete search history.

(56) References Cited

U.S. PATENT DOCUMENTS

| | | | | |
|---|---|---|---|---|
| 5,008,899 | A * | 4/1991 | Yamamoto | 375/131 |
| 5,818,885 | A * | 10/1998 | Kim | 375/354 |
| 6,108,366 | A | 8/2000 | Haartsen | 375/134 |
| 6,275,711 | B1 * | 8/2001 | Yamada et al. | 455/522 |
| 6,532,228 | B1 * | 3/2003 | Burgess et al. | 370/336 |
| 6,590,928 | B1 | 7/2003 | Haartsen | 375/134 |
| 6,711,151 | B1 * | 3/2004 | Ziegler | 370/350 |
| 6,718,395 | B1 * | 4/2004 | Ziegler | 709/248 |
| 6,731,939 | B1 * | 5/2004 | Watanabe et al. | 455/450 |
| 6,959,013 | B1 * | 10/2005 | Muller et al. | 370/512 |
| 7,079,599 | B2 * | 7/2006 | Karaoguz | 375/329 |
| 2002/0031196 | A1 * | 3/2002 | Muller et al. | 375/354 |
| 2002/0057726 | A1 * | 5/2002 | Williams et al. | 375/136 |
| 2003/0210757 | A1 * | 11/2003 | Chen et al. | 375/354 |
| 2004/0028083 | A1 * | 2/2004 | Billhartz et al. | 370/503 |
| 2005/0232219 | A1 * | 10/2005 | Aiello et al. | 370/348 |
| 2005/0237981 | A1 * | 10/2005 | Aiello et al. | 370/337 |

FOREIGN PATENT DOCUMENTS

| | | |
|---|---|---|
| WO | WO 01/99318 A1 | 12/2001 |
| WO | WO 02/01775 A1 | 1/2002 |
| WO | WO 02/063829 A2 | 8/2002 |
| WO | WO 02/065707 | 8/2002 |

OTHER PUBLICATIONS

Standard Search Report for RS 109167US Completed Aug. 6, 2003.

* cited by examiner

*Primary Examiner*—Chieh M Fan
*Assistant Examiner*—Freshteh N Aghdam

(57) ABSTRACT

In a frequency hopped wireless network, more robust method and system are disclosed for recovering clock synchronization. The method and system of the invention relies on the fact that correct decoding of a received packet occurs only when the same clock value is used to generate the decoding sequence at both the sender and the receiver. Several decoding sequences are tried based on different clock values to decode the packet. The different clock values used may be adjacent or nearby an initial estimated clock value. The clock value of the first decoding sequence to result in a correctly decoded packet is taken as the proper clock value for synchronization. Correct decoding is determined by checking the CRC of the packet.

15 Claims, 8 Drawing Sheets

CLOCK RECOVERY IN COMMUNICATION SYSTEMS

BACKGROUND OF THE INVENTION

1. Field of the Invention

The invention relates to communication systems where transmitter and receiver are time locked. In particular, the invention describes how the receiver can recover from clock slips.

2. Description of the Related Art

Advances in wireless technology and VLSI has allowed mobile radios and other portable devices to be produced with lower cost, size, and power consumption. As a result, the use of radio communication in consumer applications is becoming more widespread. In addition, it is expected that wireless technology will move beyond the present focus on voice communication (e.g., handheld radios) to include other types of communication. For example, radio communication will be used to connect master devices (e.g., laptop computer) to their respective peripheral devices (e.g., printer).

The aforementioned radio communication will require an unlicensed frequency band with sufficient capacity to accommodate high data rate transmissions. A suitable band is the ISM (Industrial, Scientific and Medical) band at 2.45 GHz, which is globally available. The ISM band provides 83.5 MHz of radio spectrum to be shared amongst all radio networks wishing to use this band.

In order to allow different radio networks to share the radio spectrum without having to coordinate with one another, some form of signal spreading is usually applied. Signal spreading involves scattering the transmitted data across the entire range of available frequencies. Each channel is assigned a unique spreading code which is used to spread the data. The data is spread in such a way that only the same spreading code may be used to recover the data. Spreading can be done either at the symbol level by applying direct-sequence (DS) spread spectrum, or at the channel level by applying frequency hopping (FH) spread spectrum. The latter is more attractive for the radio applications mentioned above, since frequency hopping can more readily incorporate the use of cost-effective radios.

A wireless system called Bluetooth™ has been developed that takes advantage of the 2.45 GHz band. Bluetooth™ provides pervasive wireless connectivity, especially between mobile and portable devices such as mobile phones, laptop computers, PDA, and other nomadic devices as well as fixed devices. The Bluetooth™ system uses frequency hopping, which enables the construction of low-power, low-cost radios with small footprints. Both data and voice communication are supported. The latter is optimized by applying fast frequency hopping in combination with robust voice coding. Frequency hopping is done at a nominal rate of 1600 hops/s through the entire 2.45 GHz band. The dwell time for one hop is 625 μs, which corresponds to the nominal time for one transmission time slot.

Devices based on the Bluetooth™ system can create so-called piconets. A piconet is basically an ad hoc network of two or more Bluetooth™ devices connected together. Each piconet includes a single master device and one or more slave devices. The master device controls all communication in the piconet. Slave devices can only communicate in response to a master device. The master device can communicate with any slave device. Communication is carried over a frequency hopped channel in the 2.45 GHz band mentioned above. All devices in the piconet have to use the same hopping sequence. The hopping sequence is determined by the identity of the master device.

Each Bluetooth™ device has a free-running system clock. The system clock of a master device determines the phase in the hopping sequence used in the piconet. Since the free-running clocks of the master and the slaves are not coordinated, mutual drift will occur. The slave devices then have to align their clocks with the clock in the master device to be able to communicate. The clock alignment keeps the slave devices in phase synchronization with the master device. Clock alignment can be accomplished by adding a time offset to the clocks in the slave devices. For more details, see "The Bluetooth radio system," J. C. Haartsen, *IEEE Personal Communications Magazine*, Vol. 7, No. 1, February 2000, pp. 28-36.

The hop sequences used in the Bluetooth™ system are generated through a hop selection mechanism. An example of a hop selection mechanism is described in U.S. patent application Ser. No. 08/950,068, entitled "Method and apparatus for the generation of frequency hopping sequences," filed on Oct. 24, 1997. See also U.S. patent application Ser. No. 08/932,911, entitled "FH piconets in an uncoordinated wireless multi-user system," filed on Sep. 18, 1997. Both of these patent applications are hereby incorporated by reference. The patent applications describe a hop sequence selection mechanism wherein the hop carriers are generated "on the fly" because the mechanism has no inherent memory. Instead, address and clock information are used to instantaneously determine the hop sequence and phase and, therefore, the desired hop carrier. The advantages of such a selection scheme are numerous. For example, the selection scheme allows a slave device to jump from one piconet to another by simply selecting a different master address and clock combination.

The frequency hopping sequences used in Bluetooth™ are based on the 28 LSB bits in the master address. For purposes of this description, these 28 bits will be referred to as the master identity. As a result, there are $2^{28}$ (or 268,435,456) different hop sequences available. The length of each sequence is determined by the master clock, which counts from 0 to $2^{27}-1$ at a rate of 1600 increments per second. The counting wraps around after about 23.3 hours. The number of possible sequences and the size of each sequence make it impossible to store the sequences and process them off-line. Instead, a sequence selection mechanism such as described in the above referenced patent applications is used.

For proper operation of the Bluetooth™ system, the master and the slave have to remain in frequency hop synchrony. The frequency hopping is driven by the system clock of the master device. At each packet reception, the slave adjusts its clock offset such that the input to the slave's hop selection mechanism is aligned with the input to the master's hop selection mechanism. To maintain synchronization, the slaves use a special synchronization word called the access code in the Bluetooth™ packets. The slaves obtain the access code by scanning the packet they receive from the master.

For the above approach to work properly, the slave has to receive packets from the master on a regular basis. If the time elapsed since the last packet reception becomes too long, there is a risk the access code transmitted by the master will fall outside the scan window of the slave. The slave can widen its scan window to try and catch the access code again (at the expense of power consumption). Nevertheless, an error in the clock alignment will occur if: (1) the misalignment is larger than one time slot, and (2) the considered time slots happen to use the same carrier frequency. The latter scenario can happen when a hopping sequence results in the same carrier frequency for two consecutive or nearby time slots. In that case, the receiver may obtain the right carrier frequency, but the wrong time slot and hence, the wrong clock synchronization. Because correct clock alignment is required to decode the whitening and, in some cases, the encryption performed in Bluetooth™ systems, packets cannot be decoded correctly (if the clocks are not aligned).

Accordingly, it is desirable to provide a more robust way to recover clock alignment in a wireless communication system. Specifically, it is desirable to provide a more robust method and system of recovering clock alignment in a Bluetooth™ system.

SUMMARY OF THE INVENTION

The invention is directed to a more robust method and system of recovering clock alignment in a Bluetooth™ system. The method and system of the invention relies on the fact that correct decoding of a received packet occurs only when the same clock value is used to generate the decoding sequence at both the sender and the receiver. Several decoding sequences are tried based on different clock values to decode the packet. The different clock values used may be adjacent or nearby an initial estimated clock value. The clock value of the first decoding sequence to result in a correctly decoded packet is taken as the proper clock value for synchronization. Correct decoding is determined by checking the CRC of the packet.

BRIEF DESCRIPTION OF THE DRAWINGS

A more complete understanding of the invention may be had by reference to the following detailed description when taken in conjunction with the accompanying drawings, wherein.

DETAILED DESCRIPTION OF THE INVENTION

Embodiments of the invention provide a method and system of recovering a clock in a mobile device. The invention is based on the fact that unambiguous clock recovery can be carried out when two or more system parameters depend on clock values. In general, when only a single system parameter is used, errors in clock recovery can occur because given a single parameter X and clock values k and m, it is possible that $X(k)=X(m)$, even though $k \neq m$. However, when combined with a second parameter Y, there is a high probability that $Y(k) \neq Y(m)$ when $k \neq m$. This is true even when $Y(a)=Y(b)$ for $a \neq b$, where a and b are clock values different from k and m. In accordance with embodiments of the invention, the two system parameters on which unambiguous clock recovery may be based are the selected frequency and the whitening sequence. In some embodiments, it is possible to add a third clock value based parameter Z, such as the encryption sequence.

Figure 1:
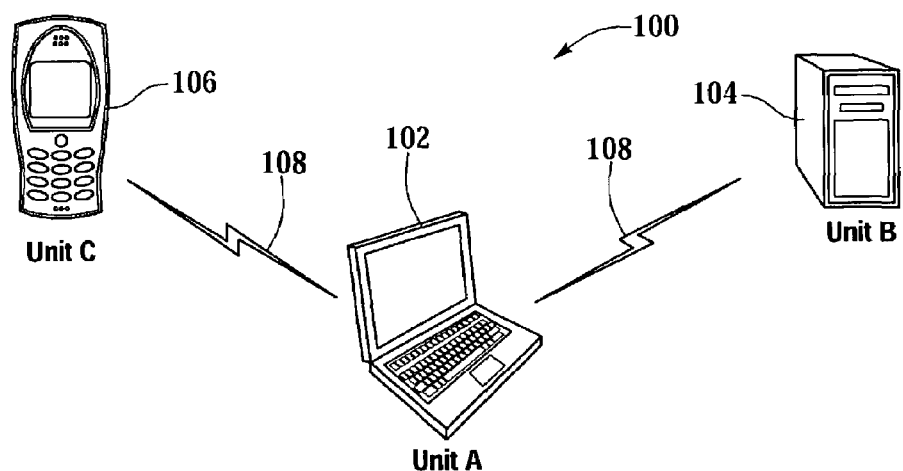
FIG. 1 illustrates an exemplary Bluetooth™ wireless network.

Referring now to FIG. 1, an exemplary network 100 is shown. The network 100 may be an ad hoc wireless network such as a Bluetooth™ piconet. Although the invention is described in the context of Bluetooth™, the principles and teachings of the invention may be equally applicable to other types of networks. The Bluetooth™ piconet 100 may include a plurality of mobile and portable devices such as mobile phones, laptop computers, PDA, as well as other nomadic devices and fixed devices. For convenience purposes, only three of these devices are shown here: a master 102 (e.g., a laptop computer), a first slave A 104 (e.g., a printer), and a second slave B 106 (e.g., a mobile phone). It should be noted that the designation of master and slaves is illustrative only, and any of the mobile devices 102-106 may be a master or a slave depending on which device initiated the piconet 100. Typically, the master 102 controls all communication in the piconet 100. Communication takes place only between the master 102 and the slaves 104 and 106 (i.e., there is no direct slave to slave communication). The communication is carried over a radio interface 108.

In the radio interface 108, a frequency-hop/time-division-duplex (FH/TDD) channel is defined. Time-division means that the channel is divided into time slots of a fixed period of, for example, 625 μs. The time slots are numbered from 0 to $2^{27}-1$ according to the system clock of the master. Each time slot corresponds to one clock value such that there is a one-to-one relationship between the clock values and the time slot numbers. During any time slot (or clock value), only a single packet can be sent or received. Time-Division Duplex means that transmission and reception are separated in time. A master can transmit and receive in alternate time slots. A slave can only transmit in a time slot when it has been addressed by the master in a preceding slot. Frequency-hop means that a different carrier frequency is used for each time slot. The time that is spent at each carrier frequency corresponds to the time for one time slot, or 625 μs. This dwell time leads to a nominal hopping rate of about 1600 hops/s. Thus, the kth time slot will have a carrier frequency j(k), the next time slot f(k+1), and so on. The precise frequency used is determined by a hop selection mechanism.

Figure 2:
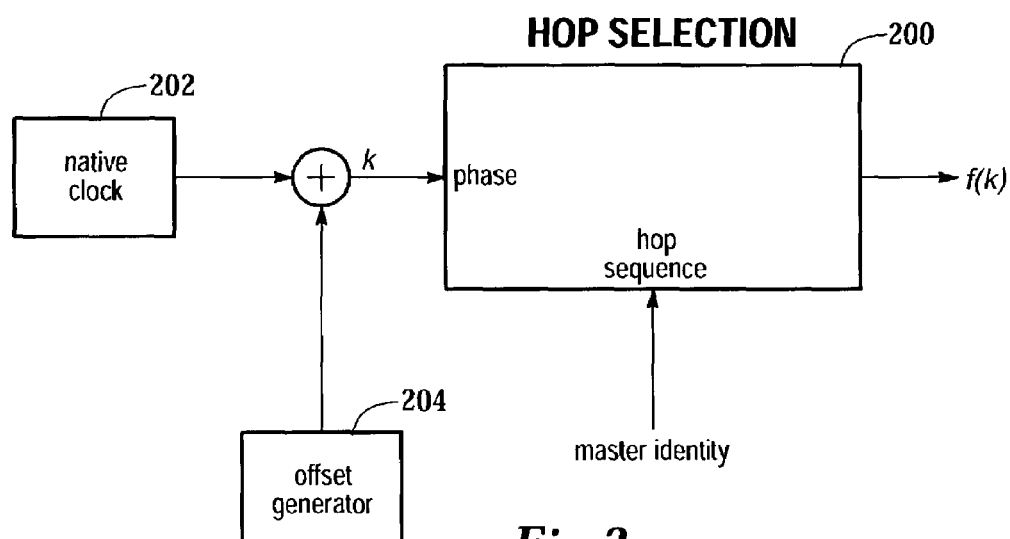
FIG. 2 illustrates an exemplary hop selection mechanism used in Bluetooth™ systems.

An exemplary hop selection mechanism is shown in FIG. 2. The hop selection mechanism 200 is used in both the master and the slaves to generate an identical hop sequence, and to simultaneously or near simultaneously select the same hop within the hop sequence. A clock input k is provided as input to the hop selection mechanism 200. The clock input k is essentially the same as the time slot number and determines the phase of the hop sequence. The phase specifies the next hop and, hence, the carrier frequency that will be used next. For a slave, the clock input k is based on a signal from a native clock 202 plus an offset from an offset generator 204. The offset compensates for any time difference between the master system clock and the slave native clock 202. Such an offset ensures that the slave will have the same phase as the master. For a master, no offset is added (i.e., offset is zero) because the native clock of the master determines the phase in the hop sequence. Note that the native clocks are free-running clocks and are never adjusted. Only the offset is adjusted. The output of the hop selection mechanism 200 is the carrier frequency f(k) corresponding to the determined phase.

Clock recovery can be accomplished by using whitening in combination with error checking. Error checking is applied to catch any errors that may have occurred in the transmission or reception of the data. A common error checking scheme is the cyclic redundancy code (CRC) check, although other schemes (e.g., checksum) may certainly be used. Whitening, or scrambling, is applied to randomize the data. In digital communications, if too many ones or zeroes in a row are sent, problems in the communication link may occur due to drift in the frequency, synthesizer and local oscillator. Also, when there are too little variations in the signal, frequency and timing recovery is more difficult in the receiver. Therefore, the data is usually descrambled with a pseudo-random whitening sequence in order create more variation. The whitening sequence is time varying and has a long cycle time to prevent packets from being retransmitted (due to failures at the receiver) with the same whitening sequence, which might lead to the same error.

Figure 3:
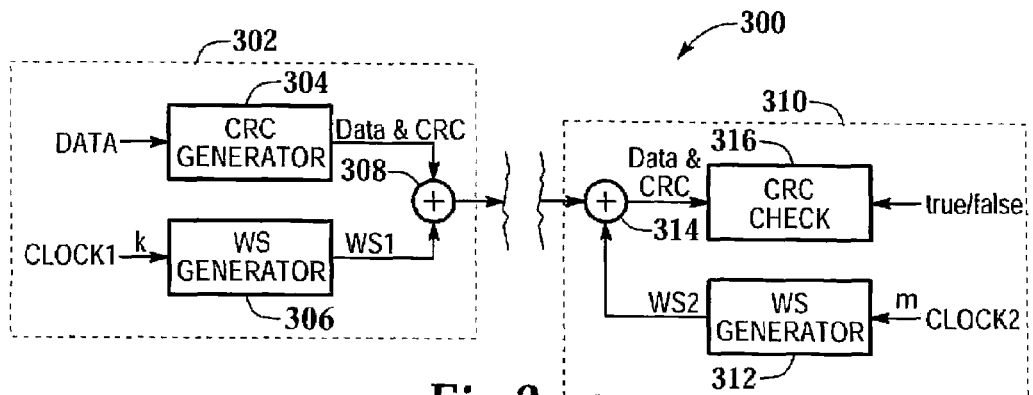
FIG. 3 illustrates a block diagram of an exemplary whitening process.

FIG. 3 illustrates a block diagram of an exemplary whitening and error checking system 300 often found in Bluetooth™ devices. At the transmitter side 302, data to be transmitted (in the form of packets) is provided to a CRC generator 304 where a CRC is generated for the data. A whitening sequence generator 306 generates a time-variant whitening sequence WS1 which is used to scramble (whiten) the encoded data at a summing node 308. The whitening sequence WS1 is generated based on the current clock value k of CLOCK1. The scrambled data is then transmitted to the receiver 310 side. At the receiver side 310, another whitening sequence generator 312 substantially identical to the first whitening sequence generator 306 is present. The second whitening sequence generator 312 generates a whitening sequence WS2 based on the current clock value m of CLOCK2. The received data is then descrambled using the whitening sequence WS2 at a summing node 314. The descrambled data is subsequently checked by a CRC checker 316.

In order for the data to pass the CRC check, it is necessary that WS2=WS1, and hence, m=k. However, if CLOCK2 is not synchronized to CLOCK1, then m≠k and the data will not be correctly descrambled (i.e., the CRC check will fail). A successful CRC check means there is a high probability that m=k, and hence, CLOCK2 and CLOCK1 are synchronized. Therefore, in accordance with embodiments of the invention, descrambling is performed using a number of different whitening sequences having different clock values until a whitening sequence WSx is found that results in a successful CRC check. The clock value for this whitening sequence WSx is then used to synchronize CLOCK2 to CLOCK1. If frequency hopping is used, only those whitening sequences whose clock values provide the same carrier frequency as clock value k are used.

Figure 4:
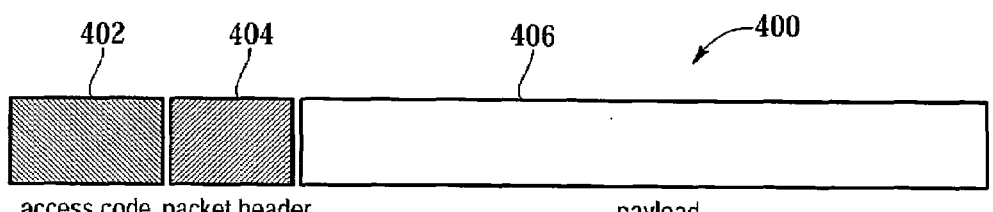
FIG. 4 illustrates an exemplary packet format used in Bluetooth™ systems.

The general format of a Bluetooth™ packet 400 is shown in FIG. 4. As can be seen, an access code 402, typically having 72 bits, precedes each packet 400. The access code 402 is derived from the 24 LSB of the master identity and has a pseudo-random property. The same access code 402 precedes all packets 400 transmitted by both the master and the slaves within a given network. When a slave receives a packet 400, a sliding correlator (not expressly shown) is used to match the access code 402. Only if the output of the correlator exceeds a certain threshold will the packet be accepted by the slave.

The sliding correlator and the access code 402 are both known to those skilled this art and are therefore not described in further details here.

The access code 402 and the correlator output can also be used to adjust the offset in the slave. As alluded to earlier, since the free-running clocks of the master and the slave are not coordinated, mutual drift will occur and the offset will change. A regular update is required to keep the offset accurate. Otherwise, the master and the slave will be out of phase and their respective hop selection mechanisms 200 will not simultaneously select the same carrier frequency.

A packet header 404, typically having 18 bits, follows the access code 402. The header 404 contains control information such as the slave's address, flow control, payload type, ARQ (Automatic Repeat reQuest) information, and so on. Such a header 404 is protected by a CRC, and is also scrambled with a whitening sequence (see FIG. 3). The CRC may be, for example, an 8-bit CRC. The whitening sequence is generated, for example, in an 8-bit Linear-Feedback-Shift-Register (LFSR) (not expressly shown). Such an LFSR is initialized with the system clock value (i.e., the time slot number) at the start of every time slot to generate the whitening sequence.

A payload 406, typically having 0-2745 bits, follows the packet header 404. In some cases, the payload 406 may also contain a CRC that can be used to check the payload for errors. Whitening is also applied to the payload 406, as well as encryption in some cases. Where applicable, the encryption key is updated in every time slot using the time slot number (i.e., the master clock value).

In a typical Bluetooth™ system, low-power modes like PARK, SNIFF and HOLD are provided. For more details, see "Specification of the Bluetooth System", Version 1.1, *Bluetooth Special Interest Group*. In these low-power modes, the slave does not participate on the channel and, therefore, does not receive regular updates of the clock timing. As a result, drift becomes a problem. Moreover, since the low-power clocks have relaxed accuracies, drifts may be even larger than in normal operation. Consequently, the slave may be out of sync with the master when it wakes up from the sleep period. In order to recover clock synchronization, the slave has to scan for a longer amount of time on the radio interface to catch the access code. Since the amount and even the direction of the drift is unknown, the slave has to begin its scan window prior to the expected master transmission time.

Figure 5:
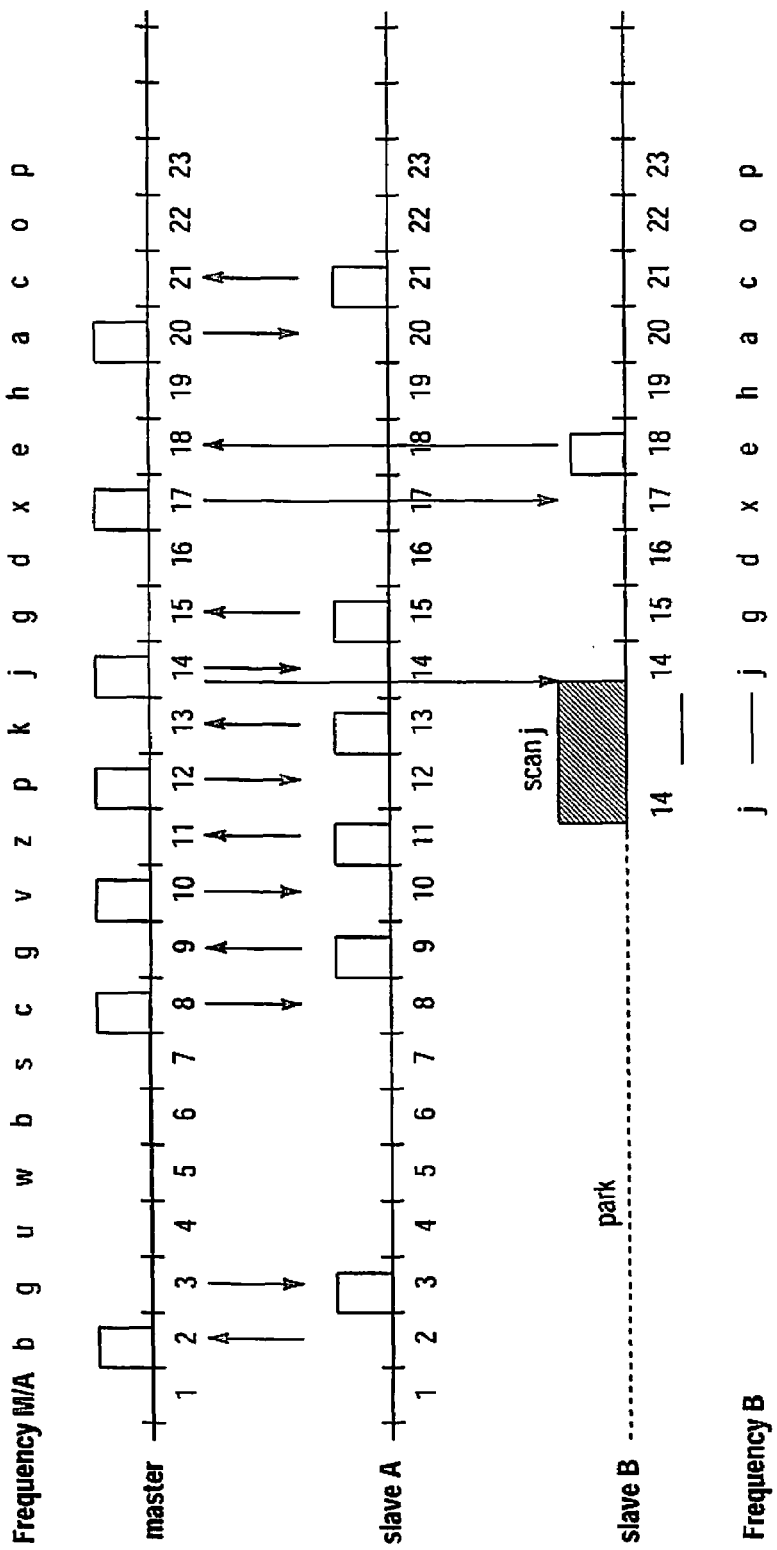
FIG. 5 illustrates an example of successful recovery of clock alignment.

An example of early scanning is illustrated in FIG. 5. In this example, the top line represents various frequencies in the hop sequence used by the master and by slave A (labeled "Frequency M/A"). The second and third lines represent the clock values (i.e., time slots) for the master and for slave A, respectively. As can be seen, each clock value corresponds to one frequency in the hop sequence. The boxes represent transmission of a packet, and the arrows indicate the direction of the transmission. Thus, in time slot 2 (i.e., clock value 2), the master has transmitted a packet to slave A using carrier frequency h. Slave A transmits a reply in time slot 3 using the next carrier frequency g.

The specific carrier frequency used for a given time slot may be determined by the hop selection mechanism. Recall that each hop selection mechanism generates the hop sequence based on the identity of the master. Thus, the same hop sequence will be used by both the master and slaves A and B. Also, the same hop in the selected sequence will be used for a given time slot. For example, all transmissions that occur in time slot 2 will use frequency b, all transmissions that occur in time slot 3 will use frequency g, and so on as shown.

In the example of FIG. 5, slave B has been in a low-power mode (park) for some time (e.g., the first 12 time slots). Slave B wakes up to find that it is now in time slot 13 according to its native system clock. Realizing that its native clock may have drifted, slave B immediately begins scanning for a transmission from the master in order to align its native clock with the master system clock. Slave B will begin scanning at a time slot that is later than the time slot presently indicated by its native clock. By scanning at a later time slot, slave B increases the probability that it will capture the transmission and, hence, be able to synchronize its native clock. Selection of the later time slot may be based on, for example, the time elapsed since the last synchronization and the previously estimated drift. For example, if the time elapsed since the last synchronization is 30 seconds, and the drift was previously estimated to be about 400 parts per million (PPM), then the maximum offset will be $400 \times 10^{-6}$ times 30 seconds, or 12 ms, in the positive or negative direction. This means the native clock of slave B may be off by as much as 19 to 20 time slots in either direction. Therefore, a good time slot in which to start scanning may be 19 to 20 time slots from the current time slot.

In the example of FIG. 5, slave B begins scanning for a transmission at time slot 14 using the carrier frequency assigned to that time slot. This frequency can be obtained from the hop selection mechanism 200 by providing an appropriate offset thereto. For example, assume that slave B's native clock presently is on clock value 12 (hence, time slot 12). If slave B wishes to scan for a transmission corresponding to time slot 14, it adds an offset equal to two clock values to the hop selection mechanism 200. The hop selection mechanism 200 responds by outputting the carrier frequency f(k) associated with clock value 14, namely, frequency j. Slave B thereafter uses frequency j to scan the radio interface. If a transmission is received on frequency j and the access code is correlated, slave B can assume that the transmission occurred in time slot 14. Slave B thereafter uses the timing of the transmission to generate an offset (e.g., via the offset generator) for its native clock. The offset is then used to align slave B's system clock to the master system clock.

Figure 6:
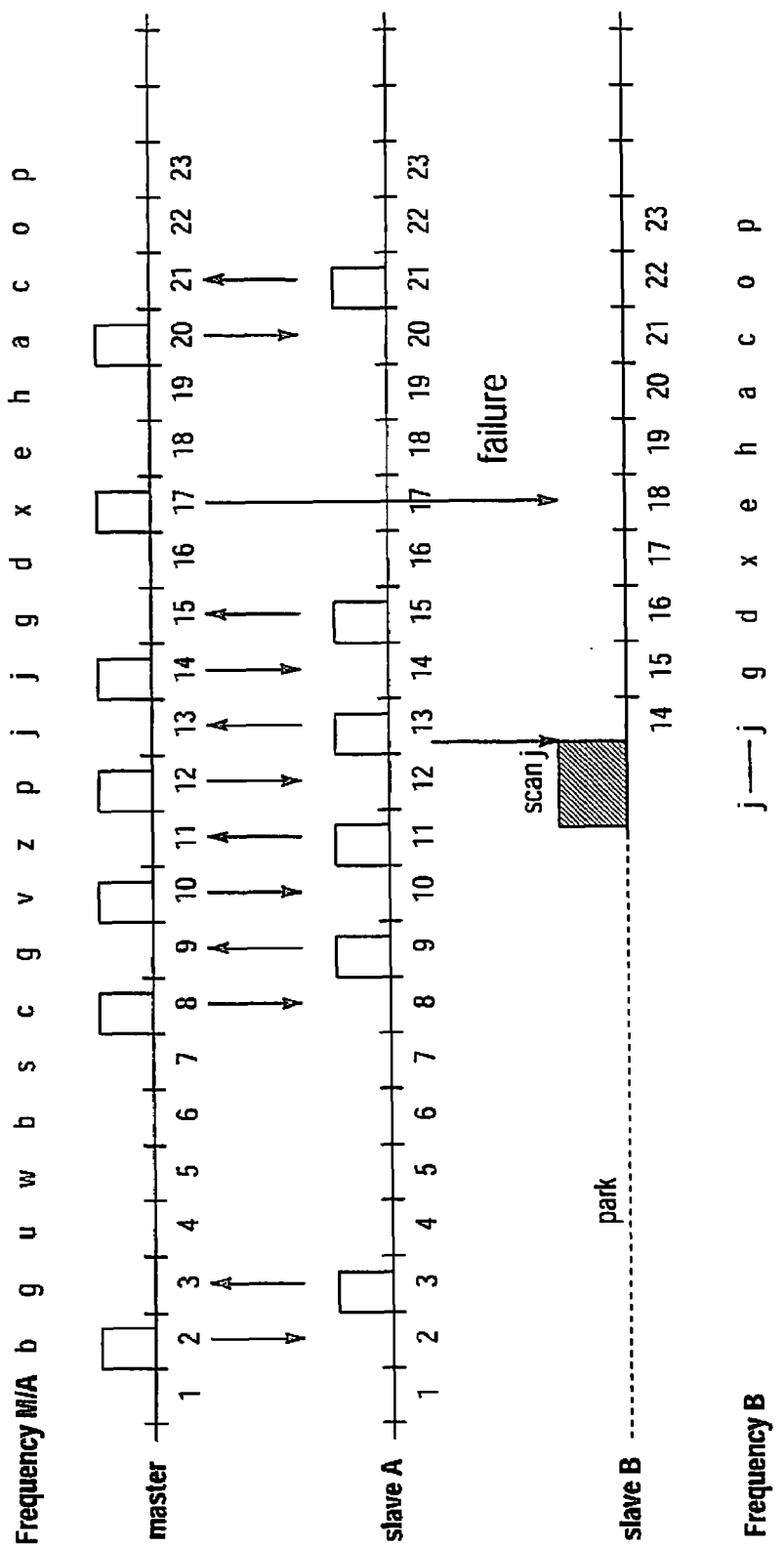
FIG. 6 illustrates an example of unsuccessful recovery of clock alignment.

FIG. 6 illustrates an example where clock value alignment is unsuccessful. This example is essentially the same as the previous example except for a different hopping sequence in the Frequency M/A line. Since the hopping sequence is pseudo-random, there is a non-zero probability that two consecutive time slots will share the same carrier frequency. This contingency is shown here, where clock values 13 and 14 both use the same carrier frequency j. Consequently, both the transmission from slave A and from the master are received during scanning. Because the transmission from slave A arrives first, slave B will lock to the system clock of slave A instead of the system clock of the master. Slave B will erroneously think that this is a master transmission on time slot 14. As a result, slave B's system clock will be ahead of the master system clock by one. Thus, at the next time slot, slave B will try to descramble the packet header using a whitening sequence based on clock value k=15, whereas the correct whitening sequence is based on clock value 14. As a result, the CRC check for the packet header will fail. Moreover, subsequent transmissions like the one on time slot 17 will be missed because the wrong offset is used and the hopping is out of sequence.

Figure 7:
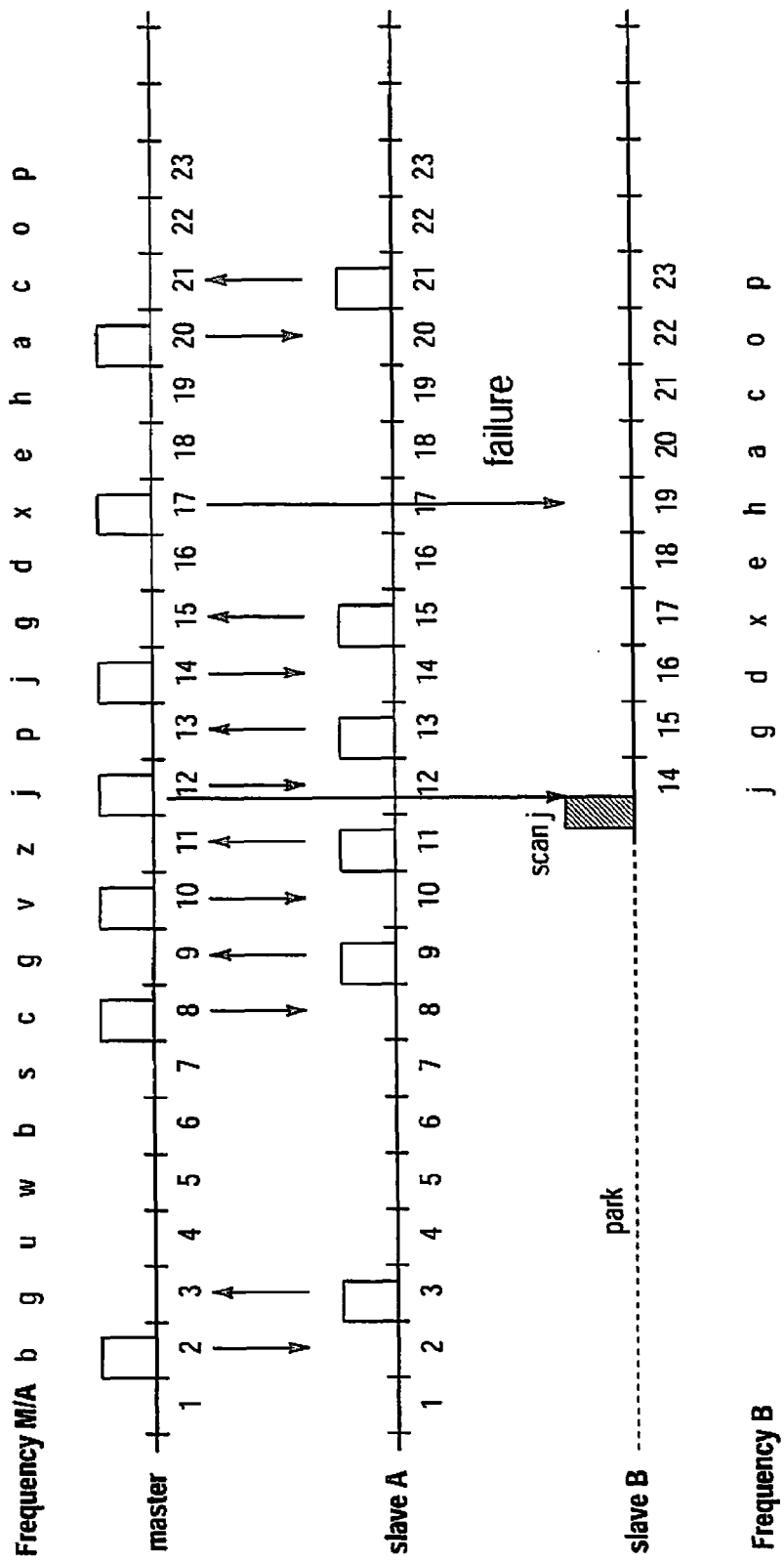
FIG. 7 illustrates another example of unsuccessful recovery of clock alignment.

Another example of unsuccessful clock recovery is shown in FIG. 7. This example is essentially the same as the previous two examples except the time slots that use the same carrier frequency are clock values 12 and 14. As a result, slave B incorrectly aligns its system clock to the earlier transmission, i.e., the one transmitted in time slot 12. Consequently, at the next time slot, slave B will try to descramble the packet header using a whitening sequence based on clock value k=15, whereas the correct whitening sequence is based on clock value 13. Slave B will also lose clock alignment.

Figure 8:
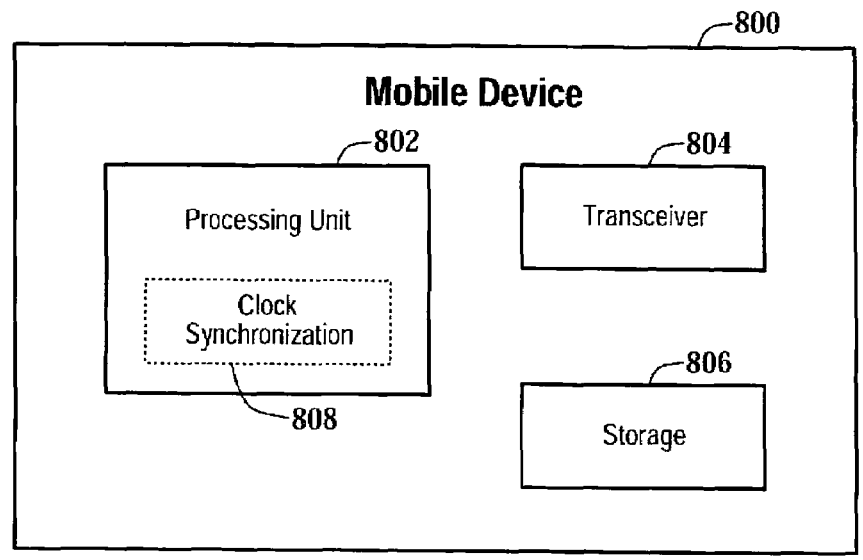
FIG. 8 illustrates an exemplary mobile device according to embodiments of the invention.

In accordance with embodiments of the invention, a mobile device 800 capable of recovering clock synchronization is shown in FIG. 8. The mobile device 800 is capable of recovering clock synchronization even in difficult cases such as the above examples. In some embodiments, the mobile device is a Bluetooth™ device. The mobile device 800 has a number of functional components including a processing unit 802, a transceiver unit 804, and a storage unit 806. The previously described hop selection mechanism, native clock, and offset generator are also present, though not expressly shown here. Although the functional components of the mobile device 800 are shown here as individual components, several components may of course be combined into one component. Conversely, a single component may be divided into several smaller components without departing from the scope of the invention.

The storage unit 806 is responsible for both temporary and long-term storage of software programs, data, and other information needed by the mobile device 800. The transceiver unit 804 is responsible for the actual sending and receiving of packets over the radio interface. The processing unit 802 generally controls the other functional components and is responsible for many of the operations in the mobile device 800. These operations include, for example, decoding the packet header, checking the CRC thereof, and so on.

A clock synchronization function 808 (indicated by the dotted lines) is also performed by the processing unit 802. The clock synchronization function 808 basically functions to recover alignment between the native clock value and the master system clock value. Such alignment may be lost, for example, as a result of the mobile device 800 entering a low-power mode. The clock synchronization function 808 causes the mobile device 800 to scan the radio interface for a transmission from the master. This transmission is then used to align the native clock of the mobile device 800 with the master system clock. An offset is then generated to compensate for the difference between the native clock and the master system clock.

Scanning for a transmission from the master includes determining which carrier frequency to scan for. The carrier frequency is determined by first selecting a time slot. The time slot selected is preferably one that is estimated to have a high probability of successful clock alignment. Generally, the time slot selected is later than the time slot presently indicated by the native clock. The clock value of the time slot selected is then provided to the hop selection mechanism. The hop selection mechanism outputs a carrier frequency corresponding to the clock value provided. The radio interface is thereafter scanned using this carrier frequency.

Aligning of the native clock, in accordance with embodiments of the invention, involves using different whitening sequences to descramble the transmission captured by the scanning. Recall that the original whitening sequence was initialized using the clock value for a certain time slot. Descrambling must be performed using a whitening sequence based on the same clock value. Thus, several whitening sequences derived from different clock values are used to try and find the correct whitening sequence. Only whitening sequences based on clock values that are near to the estimated clock value are attempted, including the estimated clock value. Preferably, whitening sequences based on a range of clock values on both sides of the estimated clock value are used in order to limit the number of attempts. Of these, preferably only those whitening sequences based on clock values that result in the same carrier frequency as the estimated clock value are used. It is not necessary to attempt descrambling with whitening sequences based on clock values that result in a different carrier frequency. A CRC check is performed after descrambling to determine whether a whitening sequence is correct. The clock value for the correct whitening sequence is accepted for clock alignment.

Figure 9:
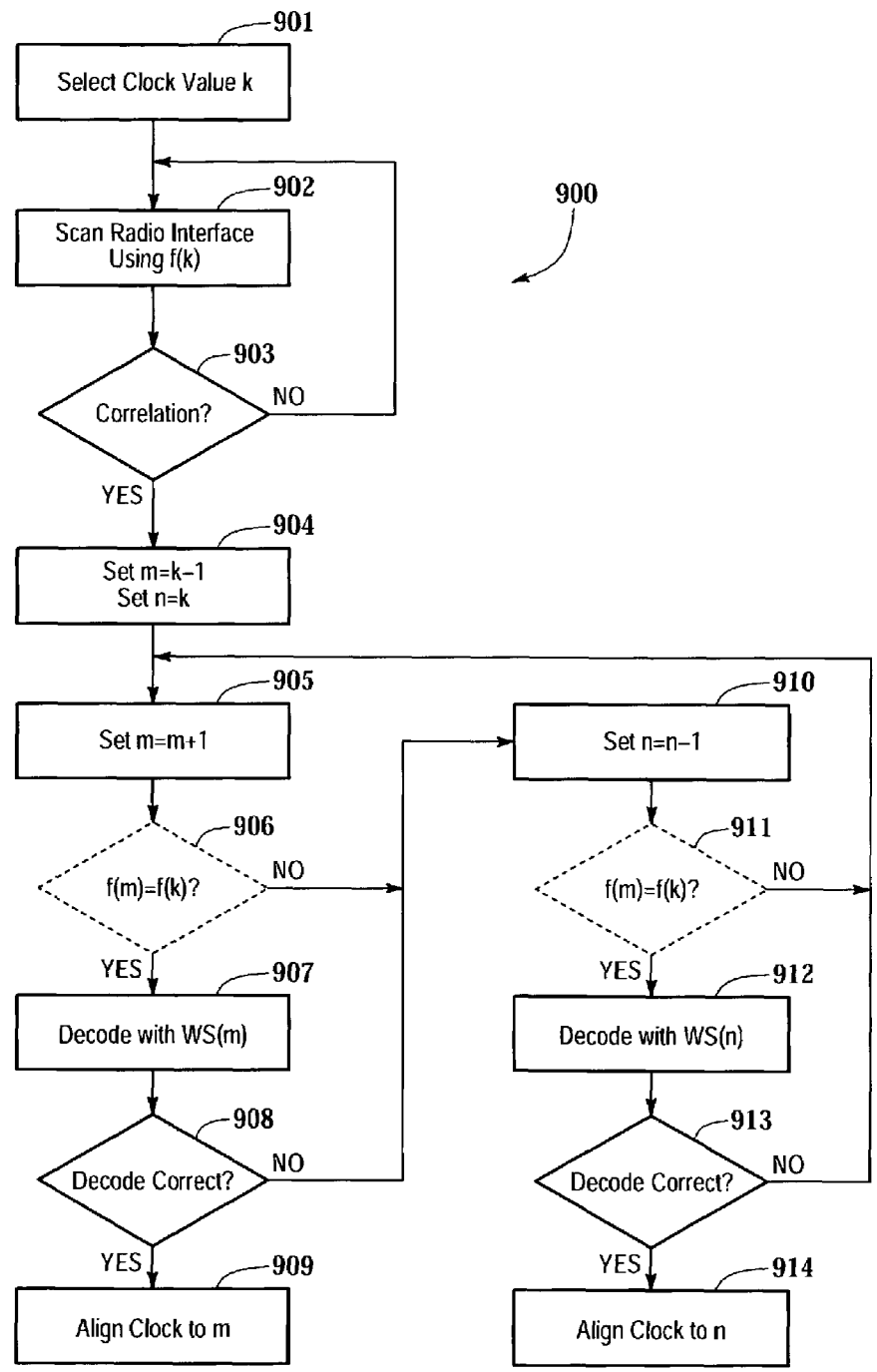
FIG. 9 illustrates an exemplary method for recovering clock alignment according to embodiments of the invention.

A flow chart of an exemplary method 900 according to some embodiments of the invention is shown in FIG. 9. It should be noted that the method 900 is one exemplary method only, and other methods may certainly be used to achieve the same or similar results without departing from the scope of the invention. The method begins at step 901 where a time slot k is selected. Preferably the time slot selected is later than the time slot presently indicated by the native clock. At step 902, a scan of the radio interface is begun using the carrier frequency resulting from the selected time slot. This scanning frequency may be determined, for example, using the hop selection mechanism. At step 903, a determination is made as to whether the access code for the received transmission is correlated. If the answer to step 903 is no, then the method returns to step 902 to continue scanning. If the answer to step 903 is yes, then the method proceeds to step 904, where temporary placeholders for the clock value is set. For example, a placeholder m is set equal to k−1, and a placeholder n is set equal to k.

At step 905, the first placeholder m is incremented by one. At optional step 906, the carrier frequency for m is compared with the scanning carrier frequency. If the two frequencies match, the method proceeds to step 907, where the received packet header is descrambled using a whitening sequence based on m (i.e., WS(m)). At step 908, a determination is made as to whether the descrambling was correct by, for example, checking the CRC of the packet header. If the answer to step 908 is yes, then an offset is generated (e.g., via the offset generator) to align the native clock value to m at step 909, and the method is ended.

If the answer to either step 908 or optional step 906 is no, then the method proceeds to step 910, where the second placeholder n is decremented by one. At optional step 911, the carrier frequency for n is compared with the scanning carrier frequency. If the two frequencies match, the method proceeds to step 912, where the received packet header is descrambled using a whitening sequence based on n, i.e., WS(n). At step 913, a determination is made as to whether the descrambling was correct, for example, by checking the CRC of the packet header. If the answer to step 914 is yes, then an offset is generated (e.g., via the offset generator) to align the native clock value to n, and the method is ended.

If the answer to either step 913 or optional step 911 is no, then the method returns to step 905, where it is repeated from that point. Under such an arrangement, whitening sequences based on clock values for time slots on both sides of the selected times slot are used to try and descramble the received packet header.

The method 900 of FIG. 9 can be applied to the previous example of FIG. 6 as follows. Recall that the first transmission received was actually in clock value 13. Slave B will try to descramble the received packet header with a whitening sequence based on clock value 14. Since the packet header was scrambled using clock value 13, the CRC check will fail. Slave B will then attempt to descramble the packet header using whitening sequences based on clock values from both sides of the selected clock value. In some embodiments, slave B first checks to see if the alternative clock values result in the same carrier frequency. The ones that are not the same are discarded. Thus, slave B may check to see whether clock value 13 (e.g., WS(13)) results in the same carrier frequency, which it does. Slave B will thereafter descramble the received packet header with a whitening sequence based on clock value 13. The subsequent successful CRC check means that the received packet was descrambled correctly, and the native clock will be aligned to clock value 13. Note that this means slave B will be synchronized to slave A instead of the master, but since slave A is synchronized to the master, slave B will also be also be synchronized to the master.

Figure 10:
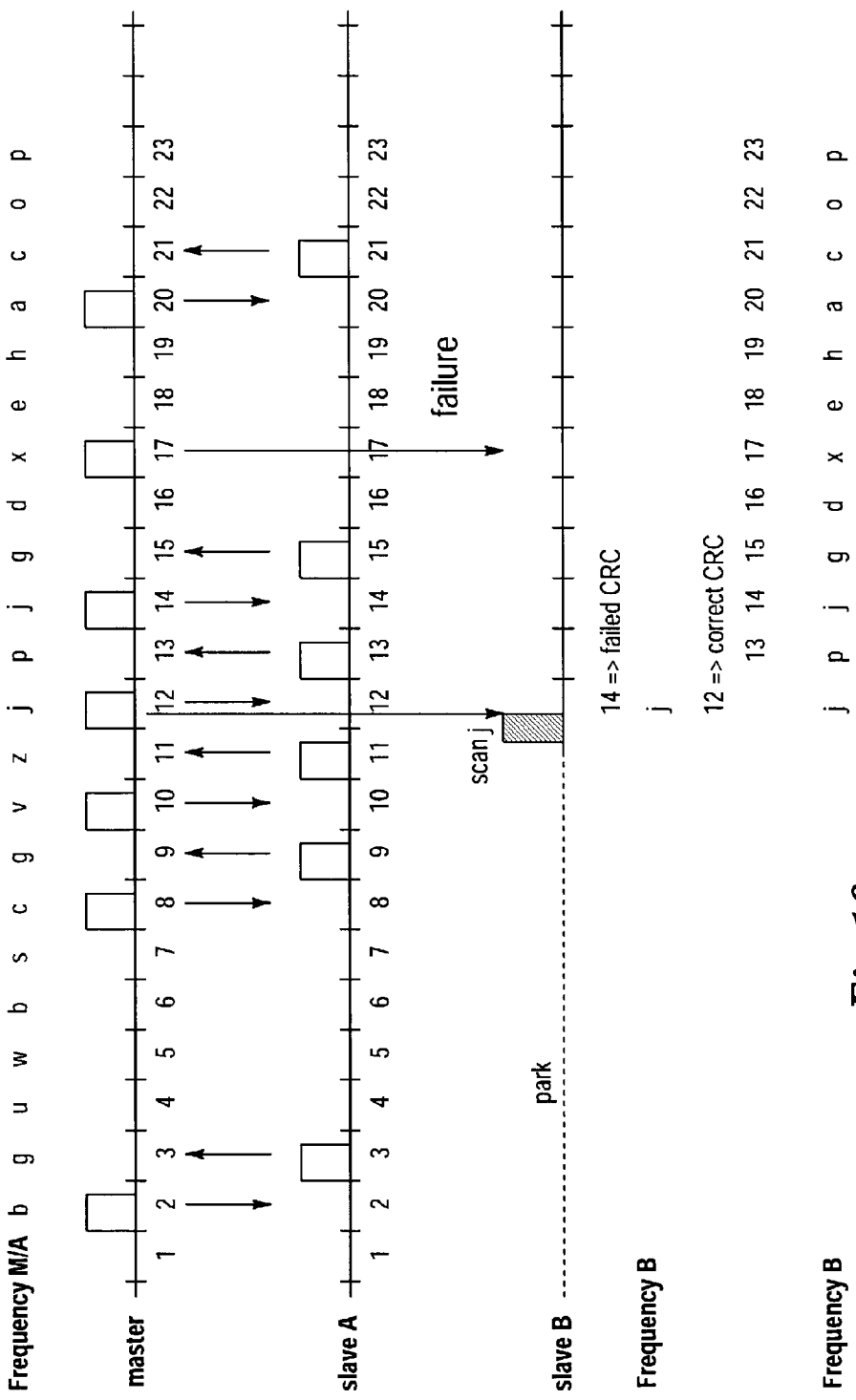
FIG. 10 illustrates an example of successful recovery of clock alignment according to embodiments of the invention.

FIG. 10 shows the method 900 of FIG. 9 as applied to the example of FIG. 7. In FIG. 10, slave B will attempt to descramble the received packet header using a whitening sequence based on clock value 14 first. It will then descramble using a whitening sequence based on clock value 12, as this is the only clock value resulting in the same carrier frequency as clock value 14. A successful CRC check causes slave B to align its native clock with clock value 12. On the other hand, if the optional steps (906, 911) are not included, then slave B will attempt to descramble using a whitening sequence based on clock value 14 first, then clock values 13, 15, and 12. Only a whitening sequence based on clock value 12 results in a successful CRC check.

The current invention is based on the fact that both the frequency selection and the descrambling are dependent on the clock. By checking these two time-varying parameters, the clock value responsible for these parameters can be deduced. However, in addition to, or instead of the above parameters, other time-varying parameters can be used. A good candidate is the encryption sequence. Usually, an encryption sequence is generated (e.g., by a stream-ciphering algorithm) that overlays the data. To prevent breaking of the encryption, each encryption sequence is generated with a time-varying variable, for example the clock, or slot or frame number. Again, if the data is protected with a CRC or other error-detecting code, by generating encryption sequences for different clock (or slot or frame) values and testing the CRC, the proper clock value can be derived.

The current invention is not limited to frequency hopping systems. Other systems may be used, for example, U.S. patent application Ser. No. 09/710,204, entitled "Method and apparatus for medium access on a radio channel," filed on Nov. 9, 2000, which is hereby incorporated by reference. This patent application describes a time-slotted system that selects a suitable channel on a single frequency using Dynamic Channel Selection (DCS). Packets are exchanged based on a token-passing protocol. A packet can be scrambled by a whitening sequence which is based on the clock value (or time slot number) of the first slot that the leading edge of the packet resides in. The packet header contains a sync word to facilitate timing synchronization. Nevertheless, the recipient must be able to accurately determine the clock value (or time slot) at the beginning of the packet in order to de-scramble the packet.

Since the packet header in the time-slotted DCS system also contains a CRC, the method of the invention can be applied to this system as well. The optional steps (906, 911), however, are not included. In other words, no clock values can be discarded be forehand. Thus, in addition to the whitening sequence based on clock value k, the following clock values are also used: k+1, k−1, k+2, k−2, . . . , k+x, k−x. For each of these clock values, the whitening sequence associated therewith is applied, and the header CRC is checked. The k+x value with the smallest x for which the CRC check passes will be taken as the proper clock value.

Figure 11:
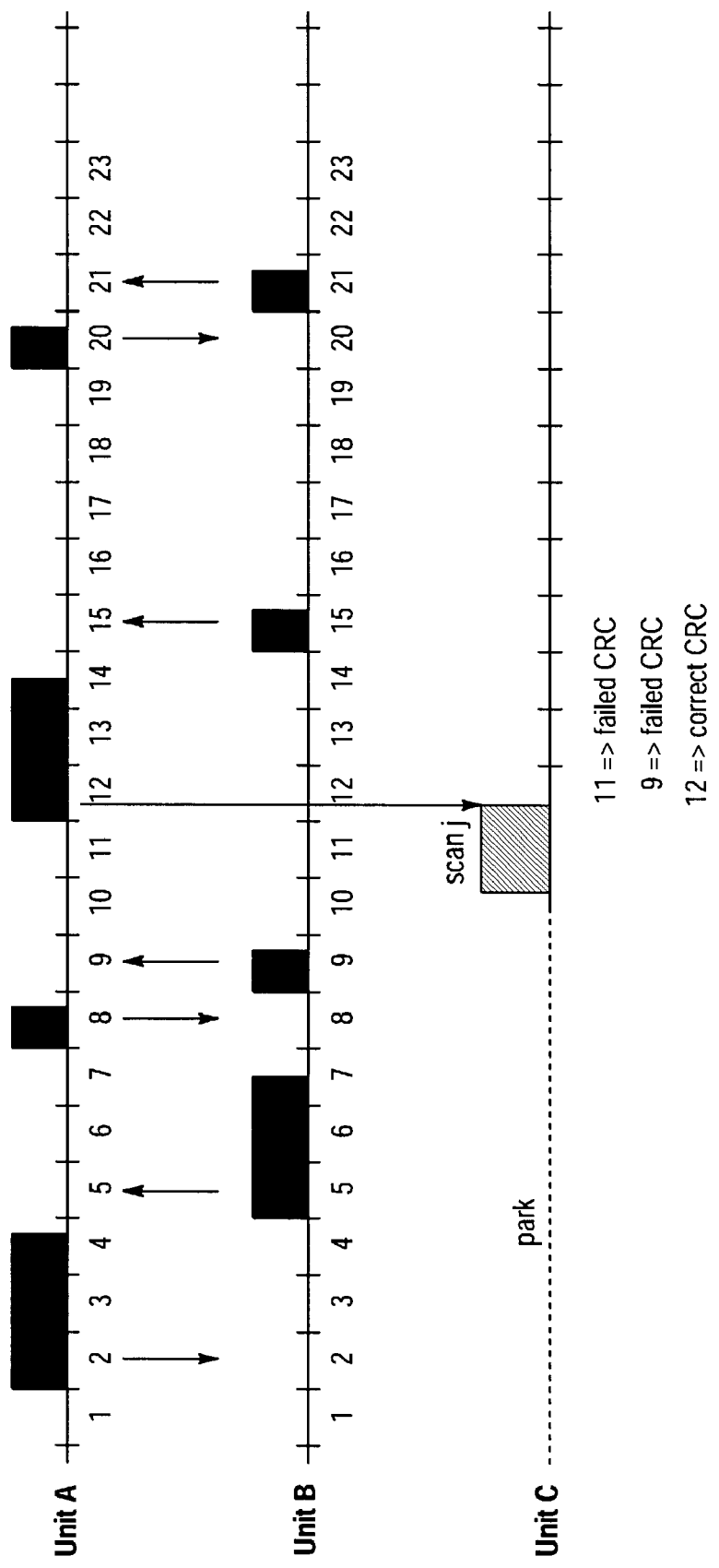
FIG. 11 illustrates an example of successful recovery of clock alignment in a general time slotted system.

The method of the invention as applied to a time-slotted DCS system is illustrated in FIG. 11. There are three mobile devices in this example: Unit A, Unit B, and Unit C. No frequency hop sequence is shown; only the clock values for the three mobile devices are present. The black boxes represent transmissions from the mobile devices and the arrows indicate the direction of transmission. Thus, for example, Unit A is transmitting to Unit B in clock values (time slots) 2 to 4. Unit B responds in clock values 5-7.

Unit C is in low-power mode and wakes up in clock value 10 as indicated by its native clock. At this time, Unit C begins scanning for a transmission from Unit A. Upon receiving a transmission, Unit C quickly realizes that the whitening sequence associated with clock value 10 cannot descramble the packet header correctly. In accordance with the teachings and principles of the invention, Unit C attempts to descramble the packet header using different whitening sequences associated with alternative clock values. Thus, an attempt to descramble the packet header is made using clock value 11, then clock value 9, then clock value 12. Clock value 12 results in a successful CRC check after descrambling and is taken as the proper clock value. An offset is then generated (e.g., via the offset generator) to align the native clock of Unit C to the system clock of Unit A.

It should be noted that the process of evaluating different whitening sequences using alternative clock values may be performed sequentially or in parallel. Sequential processing is especially useful when there are no real-time constraints. In that case, Unit C may, after the first correlation, try several clock values with the corresponding whitening sequences to check the header CRC without being concerned about the packet payload (which could be for another unit or be lost anyway when synchronization fails). Therefore, the method would not require additional hardware or cost additional power consumption. Note further that during sequential processing, the clock values are automatically updated to account for the time it takes to carry out descrambling and CRC checking. For example, in certain embodiments, if descrambling and CRC checking takes longer than one time slot, the next clock values to be tried are incremented by 1 to account for the processing time. This applies in embodiments where it is not required that the clock values attempted correspond to the same hop frequency.

As demonstrated by the foregoing, embodiments of the invention provide a method and system for synchronizing a clock in a mobile device. While a limited number of embodiments have been disclosed herein, those of ordinary skill in the art will recognize that variations and modifications from the described embodiments may be derived without departing from the scope of the invention. Accordingly, the appended claims are intended to cover all such variations and modifications as falling within the scope of the invention.

What is claimed is:

1. A method of aligning a frame clock of a slave device to a clock of a master device in a frequency hopping mobile communication system, comprising:

receiving an access code and a packet header from the master device on a preselected scanning frequency corresponding to a preselected clock value of the slave device, wherein the preselected scanning frequency is determined by a hop selection mechanism using the preselected clock value;

determining whether the access code is correlated;

when the access code is correlated, attempting to decode the packet header using a scrambling sequence based on the preselected clock value;

when the decoding is unsuccessful, attempting to decode the packet header using one or more additional scrambling sequences, the additional scrambling sequences based on different clock values near the preselected clock value, wherein the different clock values point to the same hop frequency as the preselected clock value but to a different scrambling sequence;

determining for each decoding attempt, whether the packet header was decoded correctly; and aligning the frame clock of the slave device using a clock value associated with the scrambling sequence that resulted in correct decoding of the packet header.

2. The method according to claim 1, wherein a clock value of each scrambling sequence corresponds to a frequency that is substantially the same as the preselected scanning frequency.

3. The method according to claim 1, wherein the preselected clock value is later than a clock value presently indicated by the frame clock of the slave device.

4. The method according to claim 1, wherein the one or more scrambling sequences include whitening sequences.

5. The method according to claim 1, wherein the step of determining whether the packet header was decoded correctly includes checking a cyclic redundancy check of the packet header.

6. The method according to claim 1, wherein the step of aligning includes generating an offset for the frame clock of the slave device based on the clock value associated with the decoding sequence that resulted in correct decoding of the packet header.

7. The method according to claim 1, further comprising incrementing the different clock values to compensate for processing delays in the slave device.

8. A mobile device, comprising:

a transceiver unit for communicating with a master system;

a storage unit for storing instructions and data required by the mobile device; and a processing unit for controlling the transceiver unit and the storage unit, the processing unit including a frame clock synchronization module for recovering alignment between a master system clock and a frame clock of the mobile device;

means within the transceiver unit for receiving an access code and a packet header from the master device;

means within the frame clock synchronization module for determining whether the access code is correlated;

means within the frame clock synchronization module for utilizing the packet header to verify the preselected scanning frequency when the access code is correlated;

means within the frame clock synchronization module for estimating clock values of the master device;

means within the frame clock synchronization module for attempting to decode the packet header using one or more scrambling sequences, the scrambling sequences based on the estimated clock values of the master device, wherein each estimated clock value points to the same hop frequency but to a different scrambling sequence;

means within the frame clock synchronization module for determining for each decoding attempt, whether the packet header was decoded correctly;

means within the frame clock synchronization module for attempting to decode the header utilizing a different scrambling sequence based on a different estimated clock value if the packet header was not decoded correctly; and means within the processing unit for aligning the frame clock of the mobile device using a clock value associated with the scrambling sequence that resulted in correct decoding of the packet header if the packet header was decoded correctly.

9. The mobile device according to claim 8, wherein the estimated clock value is later than a clock value presently indicated by the frame clock of the mobile device.

10. The mobile device according to claim 8, wherein the one or more scrambling sequences include whitening sequences.

11. The mobile device according to claim 8, wherein the frame clock synchronization module includes means for determining whether the packet header was decoded correctly by checking a cyclic redundancy check value of the packet header.

12. The mobile device according to claim 8, wherein the means within the processing unit for aligning the frame clock of the mobile device includes means for aligning the frame clock of the mobile device by generating an offset for the frame clock of the mobile device based on the clock value associated with the scrambling sequence that resulted in correct decoding of the packet header.

13. The mobile device according to claim 8, wherein the frame clock synchronization module includes means for incrementing the different clock values to compensate for processing delays in the mobile device.

14. A method of aligning a frame clock of a slave device to a clock of a master device in a mobile communication system, comprising:

receiving by the slave device, a first time-varying parameter and a second time-varying parameter from the master device, wherein the first and second time-varying parameters are based on a preselected clock value and include a hopped frequency and a scrambling sequence, respectively;

correlating the first and second time-varying parameters, respectively, to a plurality of first and second time-varying parameters in the slave device;

determining a correct correlation resulting from the correlating step by checking a cyclic redundancy check of the received parameters; and aligning the frame clock of the slave device using a clock value associated with the first and second time-varying parameters in the slave device that resulted in the correct correlation.

15. An arrangement in a slave device for aligning a frame clock of the slave device to a clock of a master device in a mobile communication system, said arrangement comprising:

receiving means for receiving a first time-varying parameter and a second time-varying parameter from the master device, wherein the first and second time-varying parameters are based on a preselected clock value and include a hopped frequency and a scrambling sequence, respectively;

correlation means for correlating the first and second time-varying parameters, respectively, to a plurality of first and second time-varying parameters in the slave device;

means for determining a correct correlation obtained from the correlating means by checking a cyclic redundancy check of the received parameters;

means for determining a clock value associated with the first and second time-varying parameters in the slave device that resulted in the correct correlation; and alignment means for aligning the frame clock of the slave device using the clock value associated with the first and second time-varying parameters in the slave device that resulted in the correct correlation.

\* \* \* \* \*

UNITED STATES PATENT AND TRADEMARK OFFICE
CERTIFICATE OF CORRECTION

PATENT NO.         : 7,522,689 B2
APPLICATION NO. : 10/253199
DATED              : April 21, 2009
INVENTOR(S)        : Haartsen It is certified that error appears in the above-identified patent and that said Letters Patent is hereby corrected as shown below:

In Column 6, Line 55, delete "h." and insert -- b. --, therefor.

Signed and Sealed this

Twentieth Day of October, 2009

David J. Kappos
*Director of the United States Patent and Trademark Office*